United States Patent Office.

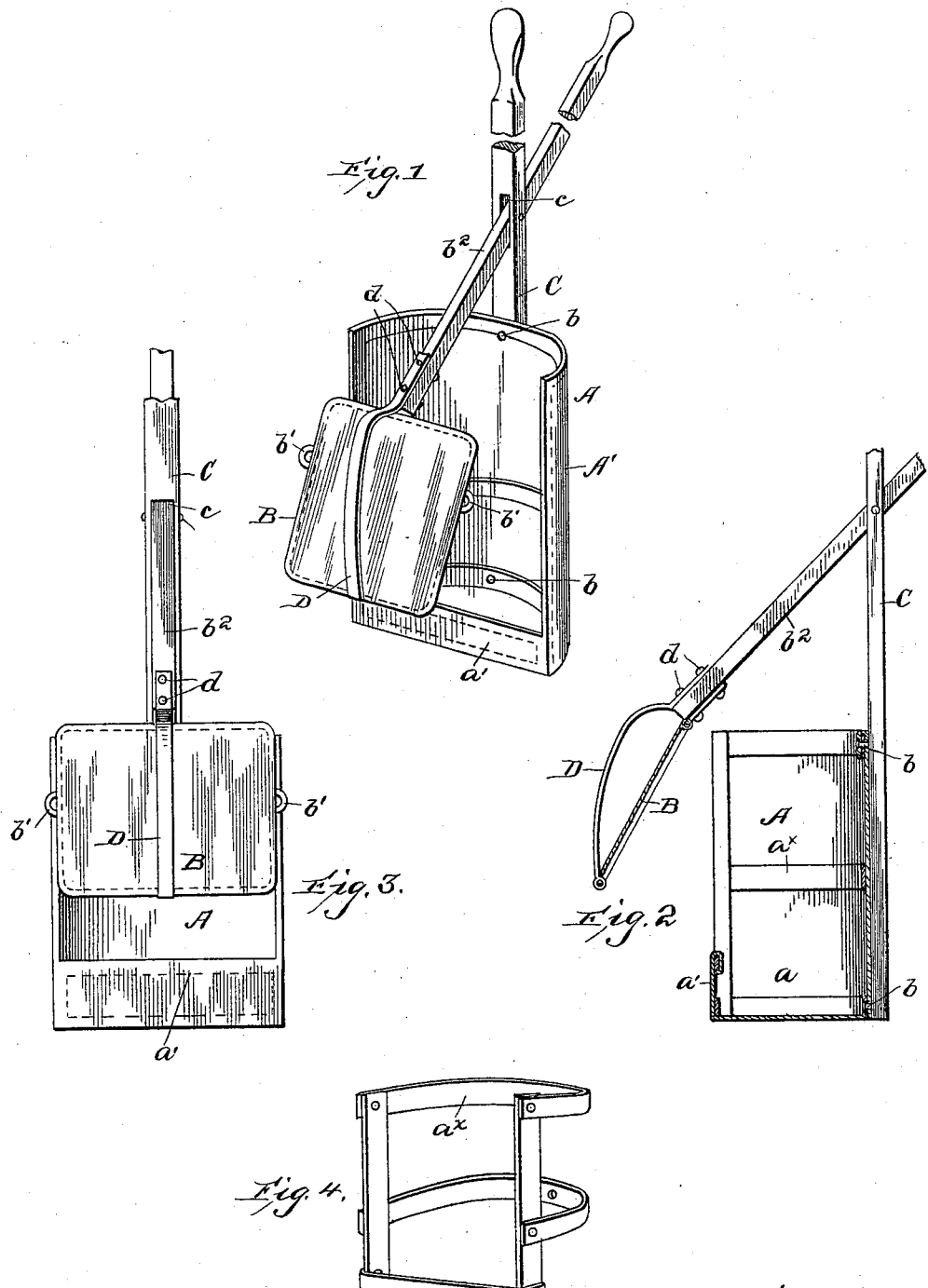

OTTO C. SANGER, OF BLUE EARTH CITY, MINNESOTA.

POTATO-BUG CATCHER.

SPECIFICATION forming part of Letters Patent No. 618,737, dated January 31, 1899.

Application filed March 19, 1898. Serial No. 674,540. (No model.)

*To all whom it may concern:*

Be it known that I, OTTO C. SANGER, a citizen of the United States, residing at Blue Earth City, in the county of Faribault and State of Minnesota, have invented certain new and useful Improvements in Potato-Bug Catchers or Destroyers; and I do hereby declare the following to be a full, clear, and exact description of the invention, such as will enable others skilled in the art to which it appertains to make and use the same.

My invention relates to improvements in potato-bug or insect catchers or destroyers.

It has for its object to provide for the ready and convenient taking of the insects or bugs and the temporary imprisoning or securing thereof until final disposition.

It consists of a partially-open front-sided receptacle, with the fractionally-closing portion of said side spanning in a straight line the bottom end of the opening, and a beater actuated by suitable means, preferably a lever fulcrumed in an upright or handle fixed to said receptacle, said beater having a spring-brace connecting its forward end and lever, and lateral jarrers or knockers adapted to act upon the lateral edges of said open side, substantially as hereinafter more fully disclosed, and specifically pointed out by the claims.

In the accompanying drawings, illustrating my invention, Figure 1 is a perspective view of my invention. Fig. 2 is a sectional elevation thereof, parts being broken away. Fig. 3 is a front elevation of the same, parts being also broken away. Fig. 4 is a perspective view of the framework of the receptacle detached.

A is a preferably semicylindrical receptacle formed of framework, preferably of flat steel strips $a^x$, covered with oil-cloth A', the oiled side being presented inward. Said receptacle has a partially-open front side, with the fractionally-closing portion $a'$ spanning in a straight line the bottom end of the opening, thus forming what is termed the "bug or insect retaining chamber or compartment" $a$.

The receptacle A has fixed or secured to it, preferably along the entire length of its back portion, a standard or handle C by suitable fastenings $b\ b$ to permit the convenient manipulation and carrying by hand of said receptacle in its use among the potato-vines and its removal in disposing of the insects or contents of said receptacle.

B is the beater, formed, preferably, of a wire frame and covered, preferably, with duck, a kind of canvas or flexible material, adapted to nearly compass the width of the opening in the front part of the receptacle A, with its lower end portion normally extending a short distance below the top edge of the portion $a'$ of said receptacle. Said beater is formed with opposite lateral loops $b'$, adapted to serve as jarrers or knockers to act upon the lateral edges of said receptacle, and thus precipitate the insects from the potato-vine caught by said beater into the chamber $a$, the insects being kept therein by successive jarring of said receptacle.

The beater B has connected thereto a lever $b^2$, passing through and fulcrumed in an opening or slot $c$ in the standard or handle C of the receptacle A, whereby by suitably grasping and manipulating the beater it is adapted to beat or act upon the caught or interposed potato-vine and effect the purpose, aforesaid, of freeing the vine of bugs or insects, as described. The connection between the beater and its lever is effected by passing or twisting the terminals of the wire of which the beater is produced around nutted bolts $d\ d$, inserted or passing through said lever, as shown, thus making a strong and durable fastening therefor.

Of course the beater is so disposed by suitably actuating the lever as to bring it down upon the potato-vine, the vine being forced down upon the top edge of the portion $a'$ and entering the receptacle in the operation of threshing said vine to free it of insects and permit the latter to be received into the bottom chamber of said receptacle.

D is a brace made of a narrow piece of bowed spring-steel with one end suitably connected or looped around the forward end of the beater B, its opposite end being secured to the lever $b^2$ by the same bolts $d$ connecting the beater to said lever. This spring-brace, while bracing the beater, as intimated, also serves to restore it to its normal position after a stroke thereof in acting upon the potato-vine.

Having thus fully described my invention, what I claim, and desire to secure by Letters Patent, is—

1. In a potato-bug or insect catcher, or destroyer, the combination with the beater, of the bowed spring-brace connected to the forward end of said beater and to the lever or handle of said beater, substantially as specified.

2. The potato-bug catcher or destroyer, comprising the semicylindrical receptacle made of framework or skeleton-like strips of flat steel and covered with oil-cloth, with the oiled portion presented inward, said receptacle having a partially-open front side, and the beater having lateral jarrers or knockers adapted to act upon the lateral edges of said receptacle, and means for actuating said beater, substantially as set forth.

3. In a potato-bug or insect catcher, or destroyer, the combination, with the receptacle having one side partially open and having a bottom chamber or compartment, of a beater comprising a wire frame and the lever or handle, the terminals of said wire frame being twisted or passed around nutted bolts passing through said handle or lever, and knockers or jarrers upon said beater, adapted to act upon the edges of said receptacle, substantially as described.

In testimony whereof I affix my signature in presence of two witnesses.

OTTO C. SANGER.

Witnesses:
O. P. BEURUD,
BENJAMIN DOEGE.